United States Patent Office 3,314,975
Patented Apr. 18, 1967

3,314,975
FLAVYLIUM COMPOUNDS AND METHODS OF USING THEM
Leonard Jurd, Berkeley, Calif., assignor to the United States of America as represented by the Secretary of Agriculture
No Drawing. Original application Jan. 25, 1963, Ser. No. 254,030, now Patent No. 3,266,903, dated Aug. 16, 1966. Divided and this application Dec. 26, 1963, Ser. No. 341,155
2 Claims. (Cl. 260—345.2)

ABSTRACT OF THE DISCLOSURE

Flavylium salts are synthesized by reacting (1) an aromatic aldehyde such as salicyl aldehyde, resorcyl aldehyde, or 2-O-benzoyl phloroglucinaldehyde with (2) an aromatic ketone such as 4-hydroxyacetophenone or 3,4-dihydroxy-α-phenoxyacetophenone, in an inert solvent saturated with HCl. The flavylium salts are stable pigments useful for the coloring of all kinds of food and beverage products, e.g., citrus-flavored soft drinks.

---

This application is a division of my copending application Ser. No. 254,030, filed Jan. 25, 1963, now U.S. Patent No. 3,266,903.

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the art of imparting color to food products. More particularly, the invention is concerned with the use of certain flavylium compounds for such purposes. The objects of the invention include the provision of novel methods and compositions of matter wherein these flavylium compounds are involved. Further objects and advantages of the invention will be obvious from the following description wherein parts and percentages are by weight unless otherwise specified. The abbreviation "p.p.m." used herein means parts per million.

It is well known in the field of biochemistry that the color of many flowers and fruits is due to their content of natural pigments called "anthocyanins." The characteristic color of cherries, cranberries, strawberries, raspberries, and grapes, for example, is primarily due to these natural coloring principles. The basic structure of the anthocyanins is the flavylium nucleus—

(I)
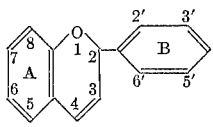

with variation as to the substituents on the various available positions on the A and B rings. The oxygen atom (at position 1) is in an oxonium configuration so that ordinarily the compounds are isolated in the form of salts with strong acids such as hydrochloric acid.

Most anthocyanins contain a glycoside group at position 3 with several hydroxy groups on the other positions, often at positions 5, 7, and 4'. A typical anthocyanin is oxycoccicyanin chloride, which has been isolated from cranberries. Its structure is—

(II)
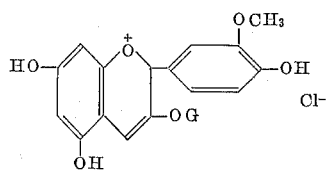

where G represents a β-glucosyl radical.

The anthocyanins may be prepared in aglycone form and these are referred to as anthocyanidins. The aglycone form of oxycoccicyanin chloride, for example, is peonidin chloride. The structure of this compound is as represented in Formula II above, but wherein G is hydrogen.

It is well understood in the food processing industry that the natural anthocyanin pigments are not stable. Thus when various food products such as berries, cherries, grapes, etc. are processed and stored their natural color diminishes or even disappears completely. A typical example in this regard is the gradual change in color from bright red to brownish-red or even brown, observed with frozen strawberries. Another example is the faded appearance of canned cherries. Many jams, jellies, and preserves display muddy brownish colors in contrast to the vivid color of the original fruit. In preparing maraschino cherries, it is conventional to brine the fresh cherries in a solution containing sulphites or bisulphites. Contact of this brine with the fruit causes a complete loss of color so that the fruit has a straw-yellow appearance, requiring addition of a food dye when the product is put up for sale.

It has now been found that the instability of the natural pigments is primarily due to the substituent at the 3-position. In the glycosidic form of the pigments (the anthocyanins themselves) this position is occupied by a sugar residue. In the aglycone form of the pigments (the anthocyanidins), this position is occupied by a hydroxy group. Either a sugar residue or a hydroxy group at the 3-position, I have determined, makes for instability. It has been found, moreover, that if the glycoside residue or hydroxy group at position 3 is replaced by any one of several other types of substituents, the problem is obviated in that the compounds are stable and retain their original color despite long exposure to adverse conditions such as contact with acids, sulphur dioxide, enzymes, heat, light, etc.

In particular, I have found that the pigments wherein the 3-position is occupied by hydrogen, a lower alkyl radical, a lower alkoxy radical, a phenyl, radical, or a phenoxy radical are stable. Accordingly, pigments having such a structure are eminently useful for coloring food products in that the product will retain its color despite subjection to adverse conditions over long periods of time. The compounds of the invention may be employed to supplement natural colors of food products or they may be used to replace the natural color. A particularly significant item is that the compounds of the invention retain the basic structure naturally occurring in plant pigments; hence their use with food products is justified.

The compounds of the invention are most readily prepared by the Robinson method (see D. D. Pratt and R. Robinson, J. Chem. Soc. 745 (1923)) which involves conensation of (1) orthohydroxybenzaldehyde or its substituted derivatives with (2) acetophenone or the substituted derivatives thereof. By selection of the substituents on the respective reactants, any desired flavylium derivative may be produced.

In a typical example of the process, salicyl aldehyde and 4-hydroxyacetophenone in equimolar proportions are dissolved in a suitable solvent such as ethyl acetate or glacial acetic acid and the solution is saturated with hydrogen chloride gas. The product, 4'-hydroxy flavylium chloride, is produced in essentially quantitative yield. The process is illustrated by the following equation:

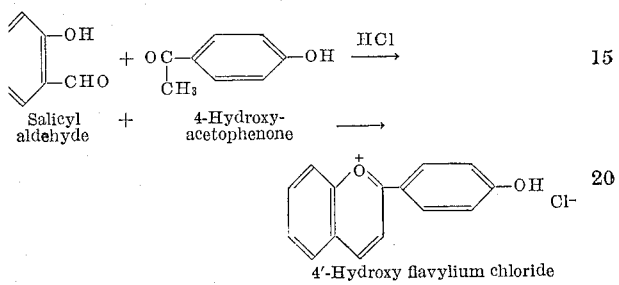

Salicyl aldehyde + 4-Hydroxy-acetophenone

4'-Hydroxy flavylium chloride

As noted above, by varying the substituents on the reactants, different compounds may be produced. Typical of the range of variation are the following examples:

| Salicyl aldehyde condensed with: | Product (Abbreviation "f.c." means flavylium chloride) |
|---|---|
| 4-hydroxy acetophenone | 4'-hydroxy f.c. |
| 3,4-dihydroxy acetophenone | 3',4'-dihydroxy f.c. |
| 3,4,5-trihydroxy acetophenone | 3',4',5'-trihydroxy f.c. |
| 3-methoxy-4-hydroxy acetophenone | 3'-methoxy-4'-hydroxy f.c. |
| α-Methoxy-4-hydroxy acetophenone | 3-methoxy-4'-hydroxy f.c. |
| 4-hydroxy propiophenone | 3-methyl-4'-hydroxy f.c. |
| α-Phenyl-4-hydroxy acetophenone | 3-phenyl-4'-hydroxy f.c. |

Flavylium compounds containing a hydroxyl group on the A ring are readily prepared by replacing salicyl aldehyde with β-resorcyl aldehyde. In a typical example of this procedure, β-resorcyl aldehyde and α-methoxy-4-hydroxy acetophenone in equimolar proportions are dissolved in a suitable solvent such as glacial acetic acid or ethyl acetate and the solution is saturated with hydrogen chloride gas. The product, 4',7-dihydroxy-3-methoxyl flavylium chloride, is formed in essentially quantitative yield. The process is illustrated by the following formulas:

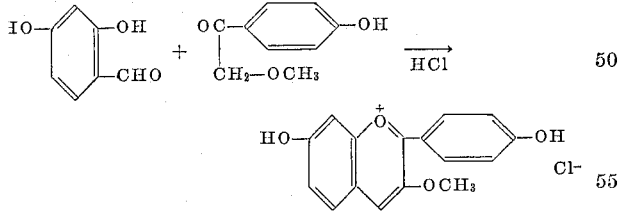

As noted above, by varying the substituents on the reactants, different compounds may be produced. Typical of the range of variation are the following examples:

Flavylium compounds containing two hydroxyls on the A ring are readily prepared by replacing the ortho-hydroxy benzaldehyde reactant by a phloroglucinaldehyde derivative. A typical synthesis in this area involves dissolving equimolar proportions of 2-O-benzoyl phloroglucinaldehyde and α-methoxy-4-hydroxy acetophenone in a mixture of ethyl acetate and absolute ethanol, saturating the solution with hydrogen chloride gas, separating the precipitated intermediate, treating this with alkali to hydrolyze the benzoyl group and acidifying the reaction mixture with hydrochloric acid to produce the product 4',5,7-trihydroxy-3-methoxy-flavylium chloride. The processs is illustrated as follows:

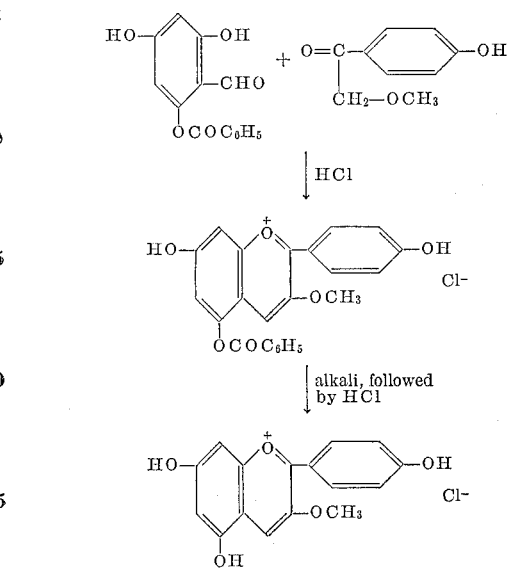

It is evident from the above that by reacting 2-O-benzoyl phloroglucin aldehyde with acetophenone derivatives, one may prepare a host of different compounds within the purview of the invention. Typical examples of the acetophenone derivatives which may be used are acetophenone, itself;

4-hydroxy acetophenone;
4-methoxy acetophenone;
4-hydroxy-3-methoxy acetophenone;
4-hydroxy-3,5-dimethoxy acetophenone;
4-hydroxy-α-methoxy actophenone;
4-hydroxy-α-3-dimethoxy acetophenone;
propiophenone;
4-hydroxy propiophenone;
4-hydroxy-α-phenyl acetophenone;
4-hydroxy-α-phenoxy acetophenone;
α-phenoxy acetophenone;
and the like.

The compounds of the invention may be described generically as flavylium salts characterized in that the 3-

| Reactant 1 | Reactant 2 | Product |
|---|---|---|
| β-Resorcyl aldehyde | α,4-dimethoxy-acetophenone | 7-hydroxy-3,4'-dimethoxy-flavylium chloride. |
| Do | 4-hydroxy-3,α-dimethoxy-acetophenone | 4',7-dihydroxy-3,3'-dimethoxy-flavylium chloride. |
| Do | 4-hydroxy-acetophenone | 4',7-dihydroxy-flavylium chloride. |
| Do | 4-hydroxy-α-phenoxy-acetophenone | 4',7-dihydroxy-3-phenoxy-flavylium chloride. |
| Do | 4-hydroxy-propiophenone | 4',7-dihydroxy-3-methyl-flavylium chloride. |
| Do | 4-hydroxy-3,5-dimethoxy-α-phenyl-acetophenone | 4',7-dihydroxy-3',5'-dimethoxy-3-phenyl flavylium chloride. |
| Do | 4-hydroxy-3,5-dimethoxy-acetophenone | 4',7-dihydroxy-3',5'-dimethoxy-flavylium chloride. |
| Do | 3,4-dihydroxy-acetophenone | 3',4',7-trihydroxy-flavylium chloride. |
| Do | 3,4,5-trihydroxy-acetophenone | 3',4',5',7-trihydroxy-flavylium chloride. |
| Do | 3,4-dihydroxy-α-phenoxy-acetophenone | 3',4',7-trihydroxy-3-phenoxy-flavylium chloride. |
| Do | 3,4-dimethoxy-α-phenoxy-acetophenone | 7-hydroxy-3',4'-dimethoxy-3-phenoxy-flavylium chloride. |
| Do | 4-hydroxy-3-methoxy-α-phenoxy-acetophenone | 4',7-dihydroxy-3'-methoxy-3-phenoxy-flavylium chloride. |
| Do | 3-methoxy-4-hydroxy acetophenone | 3'-methoxy-4',7-dihydroxy-flavylium chloride.* |

*It is to be observed that 3'-methoxy-4',7-dihydroxy flavylium chloride is a new compound, not heretofore known or described. It has the special advantage that it imparts a typical orange color to beverages such as orange-flavored drinks and retains this color over long periods of storage. Moreover, this compound has a stable coloring effect even in beverages fortified with ascorbic acid. Further information on this compound is provided in Example I, below.

position is occupied by hydrogen, lower alkyl, phenyl, lower alkoxy, or phenoxy. Their structure is represented by the formula—

(III)
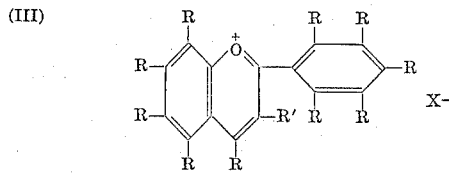

wherein each R represents a radical selected from the group consisting of hydrogen, hydroxyl, and lower alkoxy, wherein R' represents a radical selected from the group consisting of hydrogen, lower alkyl, phenyl, lower alkoxy, and phenoxy, and wherein X represents an anion.

Typical examples of specific compounds which may be employed in accordance with the invention are set forth below by way of illustration but not limitation. In the following list the abbreviation "f.c." stands for flavylium chloride.

4'-hydroxy-f.c.;
3',4'-dihydroxy-f.c;
3',4',5'-trihydroxy-f.c.;
4'-hydroxy-3-methyl-f.c;
3',4'-dihydroxy-3-methyl f.c.;
3',4',5'-trihydroxy-3-methyl-f.c.;
4'-hydroxy-3-phenyl-f.c.;
3',4'-dihydroxy-3-phenyl-f.c.;
3',4',5'-trihydroxy-3-phenyl-f.c.;
4'-hydroxy-3-methoxy-f.c.;
3',4'-dihydroxy-3-methoxy-f.c.;
3',4',5'-trihydroxy-3-methoxy-f.c.;
4'-hydroxy-3-phenoxy-f.c.;
3',4'-dihydroxy-3-phenoxy-f.c;
3',4',5'-trihydroxy-3-phenoxy-f.c;
4',7-dihydroxy-f.c.;
3',4',7-trihydroxy-f.c.;
3',4',5',7-tetrahydroxy-f.c.;
4',7-dihydroxy-3'-methoxy-f.c.;
4',7-dihydroxy-3-methyl-f.c.;
3',4',7-trihydroxy-3-methyl-f.c.;
3',4',5',7-tetrahydroxy-3-methyl-f.c.;
4',7-dihydroxy-3-methyl-3'-methoxyl-f.c.;
4',7-dihydroxy-3-phenyl-f.c.;
3',4',7-trihydroxy-3-phenyl-f.c.;
3',4',5',7-tetrahydroxy-3-phenyl-f.c.;
4',7-dihydroxy-3'-methoxyl-3-phenyl-f.c.;
4',7-dihydroxy-3-methoxy-f.c.;
3',4',7-trihydroxy-3-methoxy-f.c.;
3',4',5',7-tetrahydroxy-3-methoxy-f.c.;
4',7-dihydroxy-3,3'-dimethoxy-f.c.;
4',7-dihydroxy-3-phenoxy-f.c.;
3',4',7-trihydroxy-3-phenoxy-f.c.;
3',4',5',7-tetrahydroxy-3-phenoxy-f.c.;
4',7-dihydroxy-3'-methoxy-3-phenoxy-f.c.;
4',7-dihydroxy-3',5'-dimethoxy-3-phenoxy-f.c.;
3',4',7-trihydroxy-5'-methoxy-3-phenoxy-f.c;
4',5,7-trihydroxy-f.c.;
3',4',5,7-tetrahydroxy-f.c.;
4',5,7-trihydroxy-3'-methoxy-f.c.;
4',5,7-trihydroxy-3-methyl-f.c.;
3',4',5,7-tetrahydroxy-3-methyl-f.c.;
4',5,7-trihydroxy-3-methyl-3'-methoxy-f.c.;
4',5,7-trihydroxy-3-phenyl-f.c.;
3',4',5,7-tetrahydroxy-3-phenyl-f.c.;
4',5,7-trihydroxy-3'-methoxy-3-phenyl-f.c.;
4',5,7-trihydroxy-3-methoxy-f.c.;
3',4',5,7-tetrahydroxy-3-methoxy-f.c.;
4',5,7-trihydroxy-3'-methoxyl-3-methoxy-f.c.;
4',5,7-trihydroxy-3-phenoxy-f.c.;
3',4',5,7-tetrahydroxy-3-phenoxy-f.c.;
4',5,7-trihydroxy-3'-methoxy-3-phenoxy-f.c.;
3',4'-dihydroxy-7-methoxy-f.c.;
3',4',5'-trihydroxy-7-methoxy-f.c.;
4'-hydroxy-3',5',7-trimethoxy-f.c.;
3',4'-dihydroxy-7-methoxy-3-methyl-f.c.;
3',4',5'-trihydroxy-7-methoxy-3-methyl-f.c.;
4'-hydroxy-3',5',7-trimethoxy-3-methyl-f.c.;
3',4'-dihydroxy-7-methoxy-3-phenyl-f.c.;
3',4',5'-trihydroxy-7-methoxy-3-phenyl-f.c.;
4'-hydroxy-3',5',7-trimethoxy-3-phenyl-f.c.;
3',4'-dihydroxy-3,7-dimethoxy-f.c.;
3',4',5'-trihydroxy-3,7-dimethoxy-f.c.;
4'-hydroxy-3,3',5',7-tetramethoxy-f.c.;
3',4'-dihydroxy-7-methoxy-3-phenoxy-f.c.;
3',4',5'-trihydroxy-7-methoxy-3-phenoxy-f.c.;
4'-hydroxy-3',5',7-trimethoxy-3-phenoxy-f.c.;
4',7-dihydroxy-5-methoxy-f.c.;
3',4',7-trihydroxy-5-methoxy-f.c.;
4',7-dihydroxy-3',5-dimethoxy-f.c.;
4',7-dihydroxy-3',5,5'-trimethoxy-f.c.;
3',4',5',7-tetrahydroxy-5-methoxy-f.c.;
4',7-dihydroxy-3,5-dimethoxy-f.c.;
3',4',7-trihydroxy-3,5-dimethoxy-f.c.;
4',7-dihydroxy-3,3',5-trimethoxy-f.c.;
4',7-dihydroxy-3,3',5,5'-tetramethoxy-f.c.;
3',4',5',7-tetrahydroxy-3,5-dimethoxy-f.c.;
4',7-dihydroxy-5-methoxy-3-phenoxy-f.c.;
3',4',7-trihydroxy-5-methoxy-3-phenoxy-f.c.;
4',7-dihydroxy-3',5-dimethoxy-3-phenoxy-f.c.;
4',7-dihydroxy-3',5,5'-trimethoxy-3-phenoxy-f.c.;
3',4',5',7-tetrahydroxy-5-methoxy-3-phenoxy-f.c.

It is to be noted that the category of compounds containing a phenoxy radical at position 3 are new compounds not heretofore described. A particular object of the invention is accordingly, the provision of these compounds as new compositions of matter. The compounds in question are defined by the formula—

(IV)
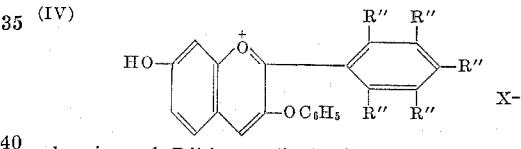

wherein each R" is a radical selected from the group consisting of hydrogen, hydroxyl, and lower alkoxy and wherein X represents an anion.

These compounds may be prepared by a modification of the classic Robinson method. This involves dissolving equimolar proportions of β-resorcyl aldehyde and a selected α-phenoxy acetophenone derivative in glacial acetic acid or ethyl acetate followed by saturation of the solution with hydrogen chloride. The corresponding 3-phenoxy flavylium chloride is formed in virtually quantitative yield. By selection of the α-phenoxy acetophenone reactant, one can readily prepare any of the compounds responding to the above formula. Typical examples of the types of α-phenoxy acetophenones which may be used and the resulting products are listed below by way of illustration and not limitation:

| α-Phenoxy acetophenone derivative condensed with β-resorcyl aldehyde | Product (the abbreviation "f.c." stands for flavylium chloride) |
|---|---|
| 2-hydroxy-α-phenoxy acetophenone. | 2',7-dihydroxy-3-phenoxy-f.c. |
| 3-hydroxy-α-phenoxy acetophenone. | 3',7-dihydroxy-3-phenoxy-f.c. |
| 4-hydroxy-α-phenoxy acetophenone. | 4',7-dihydroxy-3-phenoxy-f.c. |
| 4-methoxy-α-phenoxy acetophenone. | 7-hydroxy-4'-methoxy-3-phenoxy-f.c. |
| 3,4-dimethoxy-α-phenoxy acetophenone. | 7-hydroxy-3',4'-dimethoxy-3-phenoxy-f.c. |
| 3,4,5-trimethoxy-α-phenoxy-acetophenone. | 7-hydroxy-3',4',5'-trimethoxy-3-phenoxy-f.c. |
| 3,4-dihydroxy-α-phenoxy acetophenone. | 3',4',7-trihydroxy-3-phenoxy-f.c. |
| 3,4,5-trihydroxy-α-phenoxy-acetophenone. | 3',4',5',7-tetrahydroxy-3-phenoxy-f.c. |
| 3-methoxy-4-hydroxy-α-phenoxy-acetophenone. | 4',7-dihydroxy-3'-methoxy-3-phenoxy-f.c. |
| 3,5-dimethoxy-4-hydroxy-α-phenoxy-acetophenone. | 4',7-dihydroxy-3',5'-dimethoxy-3-phenoxy-f.c. |
| 3,4-dihydroxy-5-methoxy-α-phenoxy-acetophenone. | 3',4',7-trihydroxy-5'-methoxy-3-phenoxy-f.c. |

From a color standpoint, the compounds used in accordance with the invention provide hues ranging from yellow or orange through red and into bluish-red tones. The particular color provided by any individual compound is determined largely by its content of hydroxyl groups or ether (e.g. methoxy) groups. Compounds having a paucity of such groups provide colors at the yellow to orange end of the spectrum whereas the compounds having increasing numbers of hydroxyl and/or methoxy groups display red to bluish-red colors. It is obvious that in application of the compounds to color a particular food product, the selection of the compound to be used is simply a matter of the color desired in the product. The compounds are generally prepared and used in the form of their chloride salts. However, the particular anion (X in Formula III above) is not critical and may be derived from other acids, for example, hydrobromic.

The following tabulation illustrates the effect of different substituents on color:

| Compound | Color of acidified aqueous solution of compound in concentration of about 50 p.p.m. |
| --- | --- |
| 4'-hydroxy flavylium chloride | Lemon yellow. |
| 4',7-dihydroxy flavylium chloride | Do. |
| 3'-methoxy-4',7-dihydroxy flavylium chloride | Yellow-orange. |
| 4',5,7-trihydroxy-3-methoxy flavylium chloride | Red. |
| 5,7-dihydroxy-3,4'-dimethoxy flavylium chloride | Red. |
| 3',4',7-trihydroxy-3-phenoxy flavylium chloride | Red. |
| 4',7-dihydroxy-3-methoxy flavylium chloride | Red. |
| 7-hydroxy-3,4'-dimethoxy flavylium chloride | Red. |

The application of the compounds of the invention in the coloring of food products is conducted as with prior coloring agents or food dyes. In situations where the food product is a liquid or is packed with a liquid component, such as a brine, syrup, or the like, the compound is simply added to such liquid in the amount required to produce the desired coloration of the product. If the product is to be packed in solid form rather than with added liquid, then the product may be soaked in an aqueous solution of the flavylium compound until the desired color is attained, the product being then drained and packed in conventional manner. The amount of flavylium compound required in any particular case will depend on the shade desired in the product. Since the flavylium compounds have intense coloring action, only minute proportions thereof are required—on the order of 1 to 200 p.p.m. The compounds of the invention are useful for coloring all types of food materials which are in an acidic condition. Such condition is, of course, prevalent in most fruit and vegetable products since these contain natural acids such as citric, tartaric, malic, glycollic, etc. Also, many food products are deliberately acidified with such acids as citric, carbonic, phosphoric, tartaric, acetic, lactic, etc. The significance of the acid condition is that it is required to preserve the desired color of the compounds; at neutral or alkaline pH's the compounds tend to undergo isomerization leading to undesired color changes. Typical illustrative examples of foods which may be colored with the compounds of the invention are fruits; vegetables; juices, syrups, concentrates, or other liquid preparations made from fruits or vegetables; salad dressings; gelatin desserts, pickles and relishes; beverages such as carbonated or non-carbonated soft drinks, fruit ades, fruit-flavored drinks, wines, syrups, or bases for use in preparing carbonated or non-carbonated soft drinks. The compounds of the invention have the particular advantage that they are useful in situations where the substrate to be colored contains substances which cause decomposition of natural anthocyanin pigments or in situations where the substrate to be colored is subjected to processing or storage conditions which are conductive to decomposition of natural anthocyanin pigments. Typical of substances which adversely affect the color of natural anthocyanins are sulphur dioxide (or sulphites) and ascorbic acid. The compounds of the invention can be successfully used with food products containing such agents without loss of color, even when stored for long periods of time. A special advantage of the compounds of the invention is that they can be used with food products such as fruit-flavored beverages (or bases for forming these) which contain ascorbic acid, added for vitamin supplementation or for its preservative effect. With such products the compounds of the invention provide colors which are stable for many months of storage and in this regard are more stable than conventional certified aniline coloring principles presently used in food and beverage production. In situations where the compounds of the invention are used to color food products containing ascorbic acid, best results are obtained if the products are kept out of contact with air. This is readily done, as well understood in the art, by packing the food product containing the added flavylium compound in a hermetically sealed container or by the use of such techniques as inert gas packaging, vacuum packaging, etc.

The invention is further demonstrated by the following examples. In some of the examples compounds outside of the ambit of the invention were used for purpose of comparison. Such is the case with the compounds designated as c and d in Examples III and IV.

EXAMPLE I

*3'-methoxy-4',7-dihydroxy flavylium chloride*

(A) A solution of β-resorcyl aldehyde (28 g.) and 3-methoxy-4-hydroxy-acetophenone (34 g.) in ethyl acetate (200 ml.) and alcohol (50 ml.) was saturated with hydrogen chloride gas and allowed to stand at room temperature for about 5 hours. The red crystalline product (59 g.) was collected, washed with ether, dried, and recrystallized from boiling 5% aqueous HCl. The product, 3'-methoxy-4',7-dihydroxy flavylium chloride, was then obtained as red needles.

The compound forms intensely yellow-orange solutions when dissolved at a concentration range of 5 to 100 p.p.m. in dilute acids, for example, citric acid. The color is very similar to that obtained with the food dyes FD and C yellow No. 6 and FD and C orange No. 1. Accordingly, the compound is useful in providing a typical orange color to food products such as orange-flavored drinks and similar beverages.

In 1% aqueous citric acid, the compound shows a maximum light absorption at 469 m$\mu$. Under the same conditions, the food dyes FD and C yellow No. 6 and orange No. 1 show maximum absorption at 480 and 475 m$\mu$, respectively. In addition, the compound produces more intense colors than the known food dyes. For example, at 469 m$\mu$ the intensity of absorption of the compound is 3 times that of yellow No. 6 at its $\lambda_{max}$ (480 m$\mu$), at the same concentration.

The compound is very stable in acidic solutions. For example, the color (absorbance 0.550) of a 1% aqueous citric acid solution containing 5 p.p.m. of the compound decreased less than 1% (absorbance 0.545) on standing at room temperature in the light for 44 days. Under identical conditions, yellow No. 6 lost 8.22% of its original color. Further stability tests on the compound are given below.

(B) An orange-flavored drink was prepared by adding sugar (200 g.), citric acid (0.4 g.), sodium benzoate (0.1%), and commercial spray-dried orange flavor (1.0 g.) to 1 liter of water. To this was added about 50 p.p.m. of 3'-methoxy-4',7-dihydroxy flavylium chloride, whereby it was colored a bright yellow-orange. The solution was packed into glass bottles which were exposed to ordinary room lighting conditions and temperatures. It was observed that there was no visible change in color after the product was stored under such conditions for 3 months.

(C) A conventional beverage base containing sugar, citric acid, orange juice concentrate, ascorbic acid, and sodium benzoate (but without coloring agent) was diluted with water to prepare an orange-flavored drink. Ascorbic acid content was 37.7 mg. per 10 oz. of beverage. To 5 samples of this beverage there were added coloring agents as indicated below. The products were then sealed in clear glass soda bottles and stored exposed on a rooftop to direct sunlight in a Southern California location. This is, of course, a very severe, accelerated type of color stability test. The results are tabulated below:

| Coloring agent | Conc. of coloring agent, p.p.m. | Time of sunlight exposure required to fade product, hrs. | Ascorbic acid conc. after mg./10 fl. oz. |
|---|---|---|---|
| 3'-methoxy-4'-7-dihydroxy-flavylium chloride | 20 | 28 | 27.5 |
| Do | 40 | 70 | 23.7 |
| FD and C yellow No. 6 | 50 | 25 | 27.5 |

It was further observed that the flavor of all 3 products after exposure was satisfactory.

The data indicates that the flavylium compound exhibits greater stability in the presence of ascorbic acid than does FD and C yellow No. 6, an aniline dye conventionally used in coloring beverages.

EXAMPLE II

4'-hydroxy flavylium chloride, 3-methyl-4'-hydroxy flavylium chloride, 4',7-dihydroxy flavylium chloride, and 3-methyl-4',7-dihydroxy flavylium chloride Salicyl aldehyde and 4-hydroxy acetophenone were condensed, using the technique of Example I, to prepare 4'-hydroxy flavylium chloride (hereinafter referred to as compound a). Salicyl aldehyde and 4-hydroxy propiophenone were condensed, using the technique of Example I, to prepare 3-methyl-4'-hydroxy flavylium chloride (compound b). β-Resorcyl aldehyde and 4-hydroxy acetophenone were condensed, using the technique of Example I, to prepare 4',7-dihydroxy flavylium chloride (compound c). β-Resorcyl aldehyde and 4-hydroxy propiophenone were condensed, using the technique of Example I, to produce 3-methyl-4',7-dihydroxy flavylium chloride (compound d).

The four compounds produced bright yellow solutions when dissolved in dilute citric acid. Compounds a and b gave intensely lemon yellow solutions very similar to those obtained with FD and C yellow No. 5; compounds c and d provided somewhat deeper shades of yellow. Maximum absorption of the compounds (in 1% aqueous citric acid) was—

|  | mμ |
|---|---|
| Compound a | 432 |
| Compound b | 428 |
| Compound c | 456 |
| Compound d | 445 |

Under the same conditions, FD and C yellow No. 5 has a $\lambda_{max}$ of 427 mμ. The intensity of compound b is the same as that of FD and C yellow No. 5 whereas compound a has 2.7 times the intensity of the known food dye. Of the four compounds, those containing the 4',7-dihydroxy configuration (compounds c and d) are the most stable. A typical application of these compounds is illustrated below:

A lemon-flavored drink was prepared by adding sugar (200 g.), citric acid (0.4 g.), sodium benzoate (0.1%), and commercial spray-dried lemon flavor (0.5–1.0 g.) to 1 liter of water. To each of two samples of the beverage was added one of the flavylium compounds c and d— each in a concentration of 50 p.p.m.—whereby both were colored a bright lemon yellow. The beverage samples were packed into glass bottles which were exposed to ordinary room lighting conditions and temperatures. It was found that there was no visible color change after the products had been stored under such conditions for three months.

EXAMPLE III

4',5,7-trihydroxy-3-methoxy flavylium chloride and 5,7-dihydroxy-3,4'dimethoxy flavylium chloride Solutions were prepared by dissolving a minute amount (about 200 p.p.m.) of each of the following compounds in commercial apple juice:

(a) 4',5,7-trihydroxy-3-methoxy-flavylium chloride
(b) 5,7-dihydroxy-3,4'-dimethoxy-flavylium chloride
(c) 3,5,7-trihydroxy-4'-methoxy-flavylium chloride
(d) 3,4',5,7-tetrahydroxy-flavylium chloride (pelargonidin chloride)

To each solution was added a few drops of toluene (to avoid microbial spoilage) and the solutions stored in glass bottles exposed to ordinary room lighting conditions and room temperatures.

It was observed that initially each solution exhibited a bright red color. After three weeks' storage, solutions (a) and (b) were still bright red whereas solutions (c) and (d) were a muddy brown.

These data illustrate that the compounds (a and b) wherein the substituent at position 3 is methoxy, are stable whereas the compounds (c and d) which contain hydroxyl at position 3 are unstable.

EXAMPLE IV

4',7-dihydroxy-3-methoxy flavylium chloride and 7-hydroxy-3,4'-dimethoxy flavylium chloride Solutions were prepared by dissolving a minute amount (about 200 p.p.m.) of each of the following compounds in commercial apple juice:

(a) 4',7-dihydroxy-3-methoxy-flavylium chloride
(b) 7-hydroxy-3,4'-dimethoxy-flavylium chloride
(c) 3,4',7-trihydroxy-flavylium chloride
(d) 3,7-dihydroxy-4'-methoxy flavylium chloride To each solution was added a few drops of toluene (to avoid microbial spoilage) and the solutions stored in glass bottles exposed to ordinary room lighting conditions and room temperatures.

It was observed that initially each solution displayed a bright red color. After three weeks' storage, (a) and (b) were still bright red whereas solutions (c) and (d) were a muddy brown.

These data illustrate that the compounds (a and b) wherein the substituent at position 3 is methoxy, are stable whereas the compounds (c and d) which contain hydroxyl at position 3 are unstable.

EXAMPLE V

3',4',7-trihydroxy-3-phenoxy flavylium chloride

Equimolar amounts of the compounds β-resorcyl aldehyde and 3,4-dihydroxy-α-phenoxyacetophenone were dissolved in a solvent mixture containing four times the weight of the reactants of ethyl acetate and an equal weight of the reactants of absolute ethanol. The solution was saturated with hydrogen chloride gas, then allowed to stand overnight. After this period of time the precipitated product, 3',4',7-trihydroxy-3-phenoxy-flavylium chloride, was collected in 99% yield.

The compound was found capable of coloring fruit materials a bright red, even when used in minute quantities. Solutions of the compound were subjected to the tests described in Examples III and IV and it was found that the red color was stable to long storage in apple juice.

Having thus described the invention, what is claimed is:
1. A 3-phenoxy flavylium salt of the structure—

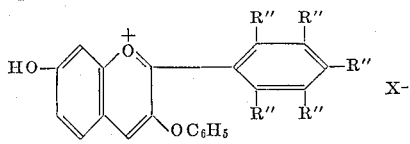

wherein each R″ is a radical selected from the group consisting of hydrogen, hydroxyl, and lower alkoxy and wherein X represents an anion selected from the group consisting of chloride and bromide.

2. 3′,4′,7-trihydroxy-3-phenoxy-flavylium chloride.

References Cited by the Examiner

UNITED STATES PATENTS 2,947,760  8/1960  Bruin et al. _____ 260—345.2
3,147,280  9/1964  Jurd _____ 260—345.2

OTHER REFERENCES

Stenlid, Physiol. Plantarium, vol. 15, pp. 598–605 (1962); abstracted C.A., vol. 58, col. 882d.

WALTER A. MODANCE, *Primary Examiner.*

JOHN M. FORD, *Assistant Examiner.*